Feb. 2, 1932.　　　H. A. HUSTED　　　1,843,676
STEERING WHEEL
Filed June 12, 1928　　　3 Sheets-Sheet 1

INVENTOR
Harry A Husted
BY
Evans & McCoy
ATTORNEY

INVENTOR
BY Harry A. Husted
Evans & McCoy
ATTORNEY

Feb. 2, 1932. H. A. HUSTED 1,843,676
STEERING WHEEL
Filed June 12, 1928  3 Sheets-Sheet 3

INVENTOR
Harry A. Husted
BY
Evans & McCoy
ATTORNEY

Patented Feb. 2, 1932

1,843,676

UNITED STATES PATENT OFFICE

HARRY A. HUSTED, OF DETROIT, MICHIGAN, ASSIGNOR TO THE H. A. HUSTED COMPANY, OF DETROIT, MICHIGAN, A CORPORATION OF MICHIGAN

STEERING WHEEL

Application filed June 12, 1928. Serial No. 284,858.

This invention relates to steering wheels for motor vehicles and more particularly to reinforced composition steering wheels and to sheet metal reinforced spiders for composition steering wheels.

In my copending application Serial No. 167,387, filed Feb. 11, 1927, and which contains claims that dominate the structure herein described, there is disclosed a composition steering wheel reinforced by a sheet metal spider having a continuous channeled rim and channeled spokes integrally connected with the rim, the rim and spokes being completely imbedded in a composition body, which is molded around the spider and forms therewith a rigid wheel structure.

The present invention is an improvement over the invention disclosed in said application and has for an object to provide a reinforced composition wheel having a reinforcing spider which is of light weight, but which possesses great strength and rigidity.

The present invention aims to provide a reinforcing spider which may be made of relatively light sheet metal in which both the rim and spokes of the spider may be relatively narrow and in which the spokes and rim are of such form and so joined together as to be capable of withstanding heavy stresses applied either radially or laterally.

A further object of the invention is to provide a reinforcing spider having a continuous rim and spokes integral with the rim in which the rim and spokes have channels on the opposite side faces thereof which are so formed that the channels of the spokes on each side are continuous with the corresponding channels in the rim, thereby providing a reinforcing spider of such form that gases trapped on either face of the spider in molding the composition thereon may escape through continuous channels to the hub portion of the spider.

A further object is to provide a spider of such form as to have substantially uniform strength throughout and of such form as to firmly bind the plastic body thereto at all points throughout the spokes and rim.

With the above and other objects in view, the invention may be said to comprise a steering wheel as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which.

Figure 1:
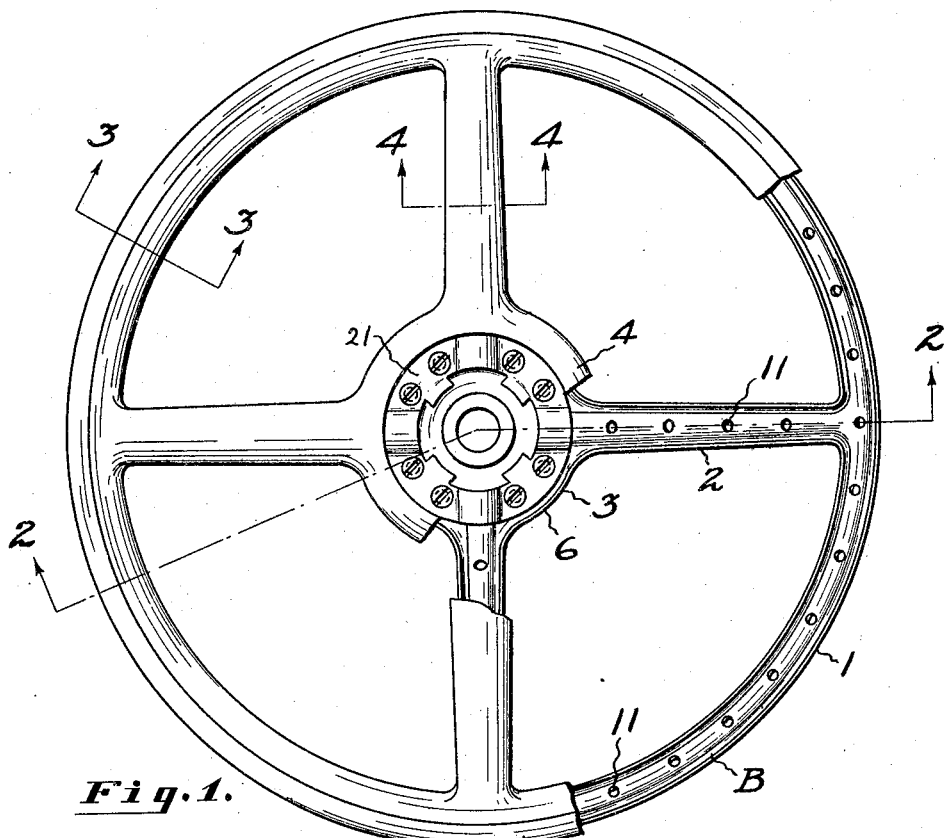
Fig. 1 is a plan view of a steering wheel embodying the invention with the composition body partially broken away to show the reinforcing spider.

Referring to the accompanying drawings, the steering wheel of the present invention consists of a body "A" of composition material which is molded around and imbeds a reinforcing spider "B" preferably formed of sheet metal and in a single piece. The spider "A" has a rim 1 of channeled form, spokes 2 which are also of channeled form and a flanged hub 3, the spokes being integrally connected with the rim at their outer ends and with the hub at their inner ends and the hub being provided with a central opening 4 to receive a steering post.

The spokes are provided with side flanges 5 which project to the same side of the spider and the flanges 5 are continuous with flanges 6 on the outer edge of the hub between the spokes and with flanges 7 along the inner edge of the rim between the spokes, the flanges 5 of the spokes forming with the flanges 6 of the hub and 7 of the rim continuous flanges surrounding the openings between the spokes of the spider. The rim 1 has a continuous outer flange 8 which projects in the same direction as the inner flanges 7 of the rim and the web portion of the rim, between the inner and outer flanges 7 and 8 thereof, is provided with a continuous corrugation or rib 9 which projects in the same direction as the flanges 7 and 8. The web portions of the spokes 2 between the side flanges 5 thereof are provided with longitudinal corrugations or ribs 9 which project in the same direction as the flanges 5 and which extend to the corrugation 9 of the rim and merge into said corrugation and which extend across the hub 3 to the central opening 4 thereof.

To more firmly bind the composition body to the spider, corrugations 9 and 10 of the spokes and rim are provided with spaced apertures 11 through which the composition on opposite faces of the spider is joined.

Figure 2:
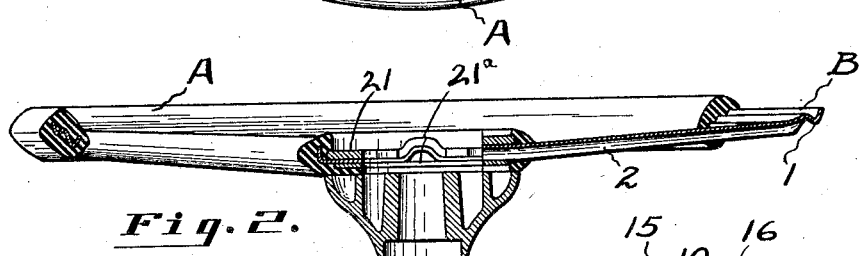
Fig. 2 is a section taken on the line indicated in Fig. 1.
Figure 3:
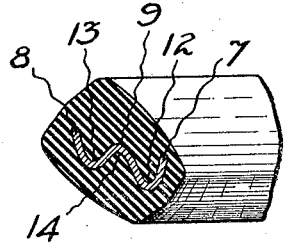
Fig. 3 is a section taken on the line indicated at 3—3 in Fig. 1.
Figure 4:
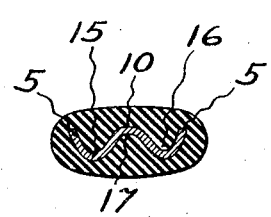
Fig. 4 is a section taken on the line indicated at 4—4 in Fig. 1.
Figure 7:
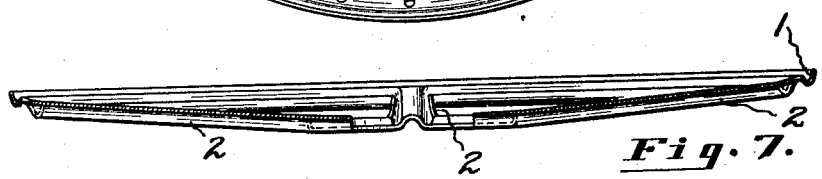
Fig. 7 is a section taken on the line indicated at 7—7 in Fig. 6.
Figure 8:
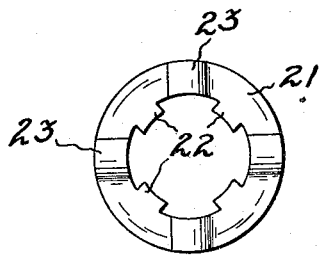
Fig. 8 is a plan view of the hub reinforcing disc.
Figure 9:
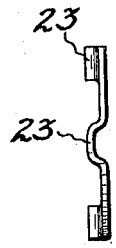
Fig. 9 is a side elevation of the disc shown in Fig. 8.

As clearly shown in Figs. 2, 3 and 7 of the drawings, the rim 1 has a pair of upwardly facing channels 12 and 13 formed between the central corrugation 9 and the inner flanges 7 and between the central corrugation 9 and the outer flange 8. The rim also has a downwardly facing channel 14 formed by the corrugation 9 and extending throughout the circumference of the rim. As shown in Fig. 4 of the drawings, the spokes 2 each have a pair of upwardly facing channels 15 and 16 formed between the central corrugation 10 and the side flanges 5 and a downwardly facing channel 17 formed by the corrugation 9.

Figure 6:
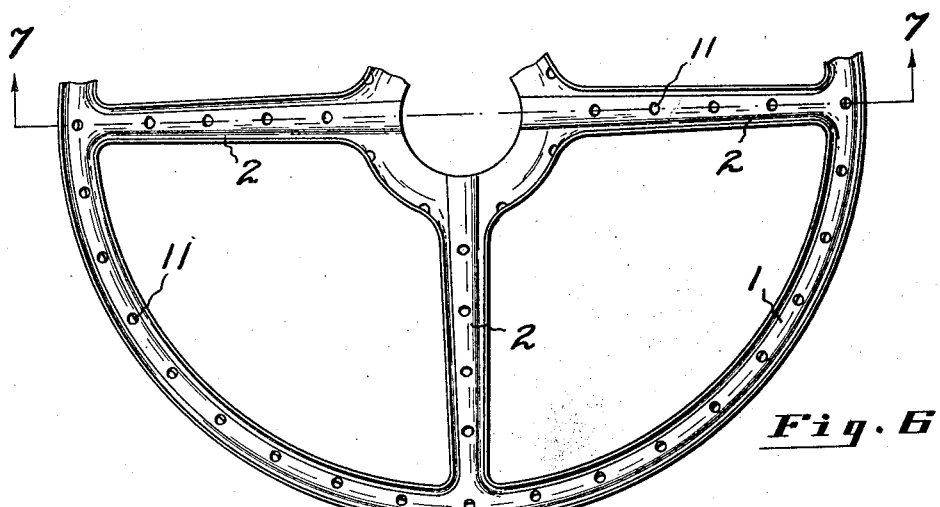
Fig. 6 is a fragmentary plan view of the finished spider.

As shown in Figs. 1 and 6, the upwardly facing channels 15 and 16 of the spokes are continuous with the channels 12 of the rim and downwardly facing channels 17 of the spokes are continuous with the downwardly facing channel 14 of the rim and since the channels of the spokes all extend to the central hub portion of the spider, continuous channels are provided on both faces of the spider for conducting any gases which may be trapped between the composition material and the surface of the spider to the central hub portion thereof, the openings 11 permitting gases to escape from the outer portion of the upper face of the rim to the channel 17.

This structure is highly advantageous in that it prevents formation of gas pockets between the surface of the metal and the plastic body in molding the plastic body on the spider. A further advantage is that the continuous chanels on both faces of the spider insure a very firm union between the composition body and the metal spider which is of substantially uniform strength throughout so that there is no danger of any portion of the plastic body breaking away from the spider.

In order to give more rigidity to the reinforcing spider and to the finished wheel, the spider is made in laterally dished form, the hub portion 3 being offset downwardly with respect to the rim portion 1 and the spokes 2 being inclined downwardly from the rim to the hub.

It has been found that greater rigidity is obtained when the wheel is dished in a direction opposite that toward which the edge flanges of the spider project. As herein shown, the spider is dished downwardly and the flanges 5, 6, 7 and 8 of the spider and the corrugations 9 and 10 project upwardly.

In order to give greater rigidity to the rim and to enable the reinforcing spider to be made with a narrower rim, the rim 1 is formed with a lateral inward inclination in the same direction as the spokes, but preferably at a considerably greater angle so that the outer flange 8 of the rim is positioned considerably above the inner flanges 7 thereof, as clearly shown in Figs. 2, 3 and 7.

Figure 5:
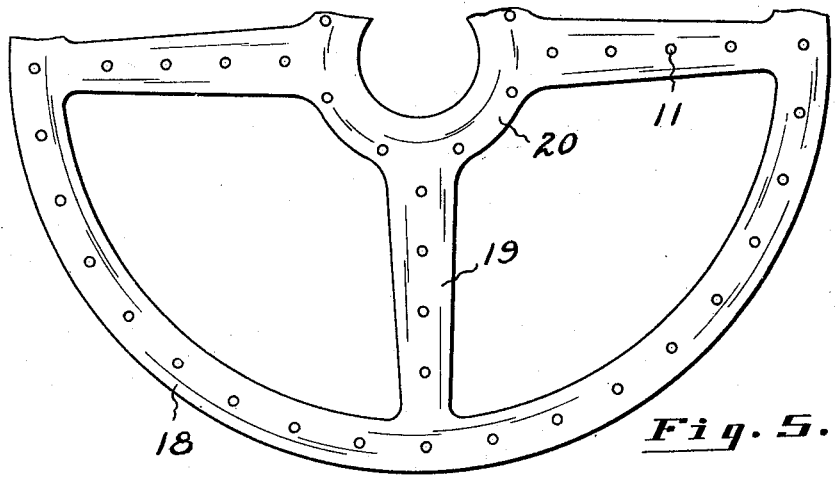
Fig. 5 is a fragmentary plan view of the sheet metal blank from which the spider is made.

The spider is preferably formed from a flat sheet metal blank such as shown in Fig. 5 of the drawings, which is punched out to form a flat rim portion 18, flat radial spoke portions 19 and a flat hub portion 20, rows of openings 11 being formed centrally of the rim and spoke portions of the blank. The channeled spider is formed from the flat blank shown in Fig. 5 in a single press operation between complemental dies of conical form. The bottom die upon which the blank is placed is of concave form with channeled portions conforming to the under side of the finished spider. This die is also provided with lugs which engage the rim portion 18 to prevent inward movement thereof upon initial engagement with the movable die with the central portion of the spider. This causes the spokes of the spider to be first slightly stretched and bent downwardly against the face of the concave die whereupon the channeled portions of the two dies are brought into engagement simultaneously with the entire spider forming the flanges and corrugations therein.

The hub portion of the spider is preferably strengthened by means of a sheet metal reinforcing disc 21 of annular form which is of a diameter to fit within the flanges 6 of the hub and which has a central opening corresponding to the opening 4 of the hub, the disc being provided with inwardly projecting lugs 22 for keying the wheel to a steering post. The disc 21 is also provided with corrugations 23 which fit upon the corrugations 9 and is integrally united to the hub body by spot welds connecting the flat portions thereof between the corrugations to the face of the hub 3.

In order to prevent spreading of the corrugation 10 and distortion of the spider under pressure in the vulcanizing mold, a second flat reinforcing disc 21a is welded to the under side of the hub portion of the spider.

Figure 10:
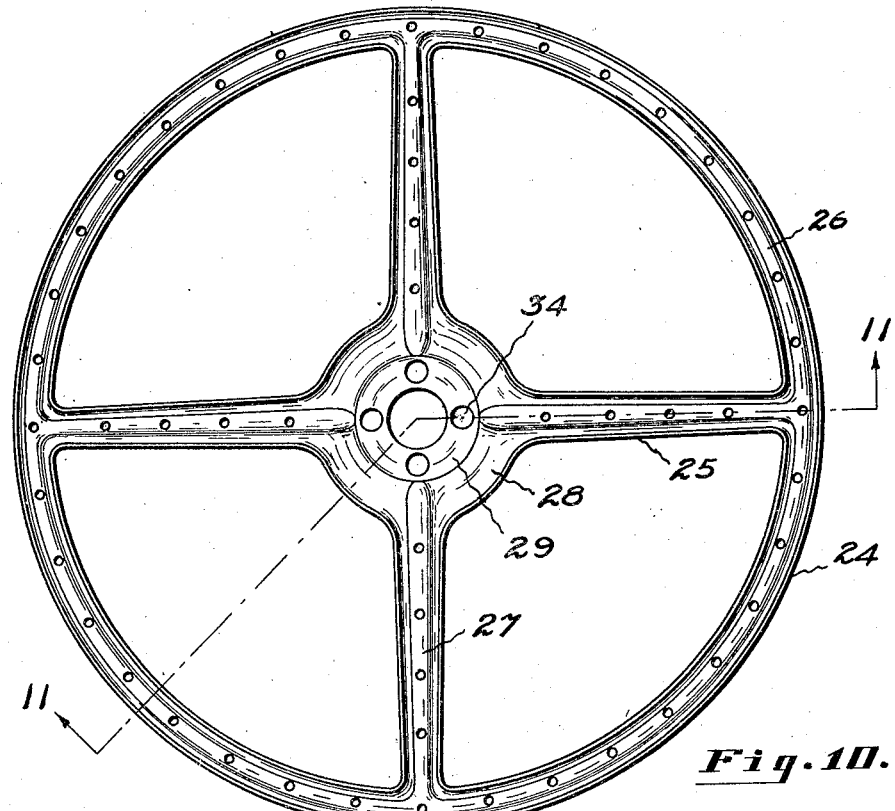
Fig. 10 is a plan view of a modified form of reinforcing spider.
Figure 11:
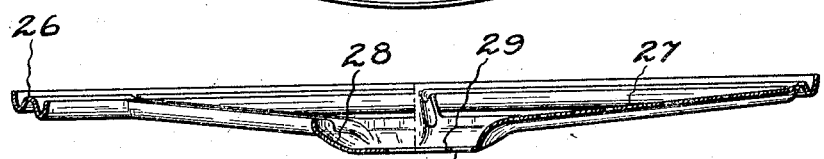
Fig. 11 is a section taken on line 11—11 of Fig. 10.
Figure 12:
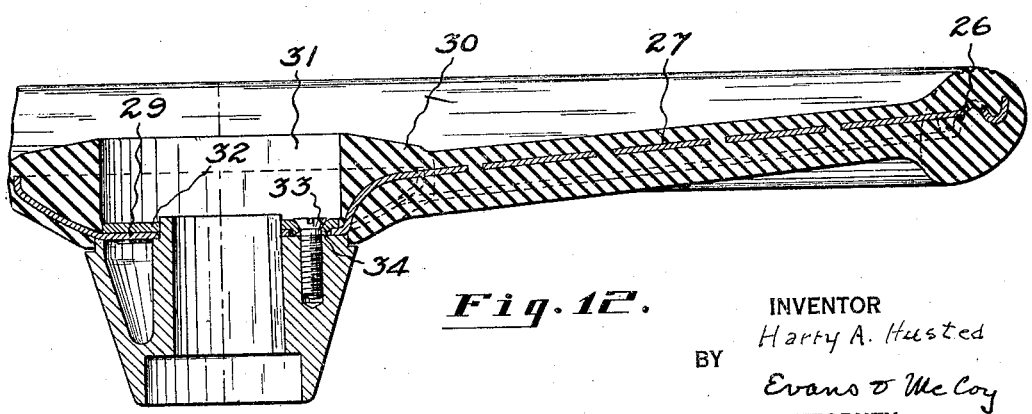
Fig. 12 is a fragmentary section of a completed wheel with the composition body molded around the spider shown in Figs. 10 and 11.

Figs. 10, 11 and 12 of the drawings show a modified construction in which the reinforcing spider has a continuous rim 24 of substantially the same cross-sectional shape as the rim 1 in the spider first described. The spider also has spokes 25 of the same cross sectional shape as the spokes 2 in the spider first described. The rim 24 has a continuous circumferential corrugation 26 and the spokes have central longitudinal corrugations 27 continuous with the corrugation 26. The hub portion 28 of the spider is, however, cupped quite deeply to provide a central attaching portion 29 which is flush with the under surface of the wheel after the composition body 30 has been applied thereto. The corrugations 27 of the spokes extend down into the depression of the hub portion 28 substantially to the bottom thereof to stiffen the hub, the deep cupping of the hub serving to materially stiffen the spider.

In the finished wheel, the composition body extends only to the attaching portion 29 of the hub of the spider so that there is a central recess 31 in the composition body at the upper side of the wheel which may be utilized in the mounting of attachments such as a horn button or light switches, a wheel lock or the like. A flat reinforcing ring 32 which fits upon the top of the attaching portion 28, the ring 32 and attaching portion 28 having registering openings 33 and 34 to receive attaching screws or bolts securing the wheel to a steering post.

It will be apparent that the present invention provides a steering wheel which possesses great strength and, by reason of the fact that the reinforcing spider is integrally formed, the connections between the spokes and rim are substantially unbreakable so that the rim cannot be broken away from the spokes even if subjected to excessive strains such as might happen in case of a wreck.

If the reinforcing spider should be stressed beyond its elastic limit, it will be distorted but not broken so that there is no danger of the rim breaking away from the spokes. This is an important feature from the standpoint of safety since in automobile wrecks drivers are often seriously injured by a broken steering wheel. Furthermore, the arrangement of reinforcing flanges, together with the dishing of the spider, and the lateral inclination of the rim, the spokes and rim of the spider may be made relatively narrow and still possess great rigidity, thus effecting economy in the manufacture of the spider and also making possible the construction of a lighter steering wheel having smaller spokes and rim and containing less composition material.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A sheet metal reinforcing spider for composition steering wheels comprising a channeled rim, channeled spokes integral with the rim and a hub portion integral with the spokes, said spider being downwardly dished, said hub portion being cupped and provided with a flat bottom portion offset downwardly with respect to the spokes, the rim and spokes having side flanges projecting upwardly, the flanges of the spokes being integral with the outer edge portion of the hub.

2. A steering wheel for automobiles comprising a one-piece sheet metal stamping for the rim, spokes and hub annulus, said stamping being pressed to channel section in said rim, spokes, and hub annulus, and a hard rubber covering molded upon and encasing said rim, spokes, and hub annulus, and a metal hub fixed to the under side of said hub annulus and having portions contacting with the under side of said pressed metal hub annulus and clamped thereto by screws.

3. A steering wheel of the character specified, including a hub having a shoulder portion thereon, a spider and rim, said spider being provided with a web portion terminating at its inner end with a flange seated on said shoulder, and spokes extending from said web in the form of an arc for a portion of their length and thence extending substantially horizontally, the outer portions of the spokes being secured to said rim.

4. A steering wheel of the character described, including a spider, rim, and hub, said spider being provided with a body portion having a flange engageable with the hub, said body portion being of substantially cup-shaped formation, and spokes radiating from the hub in the form of an arc for at least a portion of their length, and means for securing the outer extremities of the spokes to the rim, and a composition covering surrounding the entire spider structure above and below the same.

5. A steering wheel comprising a single-piece sheet metal spider embodying channeled rim, spokes and hub annulus, a composition body molded around and embedding said rim, spokes and hub annulus, a separately formed metal hub having direct engagement with portions of said hub annulus, and means for clamping said hub and hub annulus in engaged position.

In testimony whereof I affix my signature.

HARRY A. HUSTED.